(12) United States Patent
Tidwell et al.

(10) Patent No.: US 9,027,120 B1
(45) Date of Patent: May 5, 2015

(54) HIERARCHICAL ARCHITECTURE IN A NETWORK SECURITY SYSTEM

(75) Inventors: Kenny Tidwell, Los Altos, CA (US);
Christian Beedgen, San Jose, CA (US);
Hugh S. Njemanze, Los Altos, CA (US);
Pravin S. Kothari, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2634 days.

(21) Appl. No.: 10/683,191

(22) Filed: Oct. 10, 2003

(51) Int. Cl.
*G06F 12/14* (2006.01)
*G06F 21/60* (2013.01)

(52) U.S. Cl.
CPC ................... *G06F 21/606* (2013.01)

(58) Field of Classification Search
USPC .................................. 726/22, 23, 25
See application file for complete search history.

(56) References Cited

U.S. PATENT DOCUMENTS

| | | | |
|---|---|---|---|
| 5,557,742 A | 9/1996 | Smaha et al. | |
| 5,717,919 A | 2/1998 | Kodavalla et al. | |
| 5,850,516 A | 12/1998 | Schneier | |
| 5,857,190 A | 1/1999 | Brown | |
| 5,956,404 A | 9/1999 | Schneier et al. | |
| 5,978,475 A | 11/1999 | Schneier et al. | |
| 6,070,244 A | 5/2000 | Orchier et al. | |
| 6,088,804 A * | 7/2000 | Hill et al. | 726/25 |
| 6,134,664 A | 10/2000 | Walker | |
| 6,192,034 B1 | 2/2001 | Hsieh et al. | |
| 6,212,633 B1 * | 4/2001 | Levy et al. | 713/153 |
| 6,226,260 B1 * | 5/2001 | McDysan | 370/216 |
| 6,275,942 B1 | 8/2001 | Bernhard et al. | |
| 6,279,113 B1 | 8/2001 | Vaidya | |
| 6,321,338 B1 | 11/2001 | Porras et al. | |
| 6,405,318 B1 | 6/2002 | Rowland | |
| 6,408,391 B1 | 6/2002 | Huff et al. | |
| 6,408,404 B1 | 6/2002 | Ladwig | |
| 6,484,203 B1 | 11/2002 | Porras et al. | |

(Continued)

FOREIGN PATENT DOCUMENTS

WO  WO 02/045315 A2  6/2002
WO  WO 02/060117 A1  8/2002

(Continued)

OTHER PUBLICATIONS

White et al. "Anatomy of a Commercial-Grade Immune System", Proceedings of the 9th International Virus Bulleting Conference, Sep./Oct. 1999, pp. 203-228.*

(Continued)

*Primary Examiner* — Kaveh Abrishamkar

(57) ABSTRACT

A network security system having a hierarchical configuration is provided. In one embodiment the present invention includes a plurality of subsystems, where each subsystem includes a plurality of distributed software agents configured to collect base security events from monitor devices, and a local manager module coupled to the plurality of distributed software agents to generate correlated events by correlating the base security events. Each subsystem can also include a filter coupled to the manager module to select which base security events are to be processed further. The selected base security events are passed to a global manager module coupled to the plurality of subsystems that generates global correlated events by correlating the base security events selected for further processing by each filter of each subsystem.

20 Claims, 5 Drawing Sheets

(56) References Cited

U.S. PATENT DOCUMENTS

| | | | |
|---|---|---|---|
| 6,542,075 B2 | 4/2003 | Barker et al. | |
| 6,694,362 B1 | 2/2004 | Secor et al. | |
| 6,704,874 B1 | 3/2004 | Porras et al. | |
| 6,708,212 B2 | 3/2004 | Porras et al. | |
| 6,711,615 B2 | 3/2004 | Porras et al. | |
| 6,714,513 B1 | 3/2004 | Joiner et al. | |
| 6,721,713 B1 | 4/2004 | Guheen et al. | |
| 6,754,705 B2 | 6/2004 | Joiner et al. | |
| 6,789,117 B1 | 9/2004 | Joiner et al. | |
| 6,789,202 B1 * | 9/2004 | Ko et al. | 726/23 |
| 6,839,850 B1 | 1/2005 | Campbell et al. | |
| 6,892,227 B1 | 5/2005 | Elwell et al. | |
| 6,928,556 B2 | 8/2005 | Black et al. | |
| 6,941,358 B1 | 9/2005 | Joiner et al. | |
| 6,957,186 B1 | 10/2005 | Guheen et al. | |
| 6,957,348 B1 * | 10/2005 | Flowers et al. | 726/23 |
| 6,966,015 B2 | 11/2005 | Steinberg et al. | |
| 6,985,920 B2 | 1/2006 | Bhattacharya et al. | |
| 6,988,208 B2 | 1/2006 | Hrabik et al. | |
| 6,990,591 B1 | 1/2006 | Pearson | |
| 7,007,301 B2 | 2/2006 | Crosbie et al. | |
| 7,039,953 B2 * | 5/2006 | Black et al. | 726/14 |
| 7,043,727 B2 | 5/2006 | Bennett et al. | |
| 7,062,783 B1 | 6/2006 | Joiner | |
| 7,065,657 B1 | 6/2006 | Moran | |
| 7,073,055 B1 | 7/2006 | Freed et al. | |
| 7,076,803 B2 | 7/2006 | Bruton, III et al. | |
| 7,089,428 B2 | 8/2006 | Farley et al. | |
| 7,103,874 B2 | 9/2006 | McCollum et al. | |
| 7,127,743 B1 | 10/2006 | Khanolkar et al. | |
| 7,154,857 B1 | 12/2006 | Joiner et al. | |
| 7,159,237 B2 | 1/2007 | Schneier et al. | |
| 7,171,689 B2 | 1/2007 | Beavers | |
| 7,219,239 B1 | 5/2007 | Njemanze et al. | |
| 7,222,366 B2 | 5/2007 | Bruton, III et al. | |
| 7,260,830 B2 | 8/2007 | Sugimoto | |
| 7,260,844 B1 | 8/2007 | Tidwell et al. | |
| 7,278,160 B2 | 10/2007 | Black et al. | |
| 7,293,287 B2 | 11/2007 | Fischman et al. | |
| 7,308,689 B2 | 12/2007 | Black et al. | |
| 7,333,999 B1 | 2/2008 | Njemanze | |
| 7,376,969 B1 | 5/2008 | Njemanze et al. | |
| 7,386,733 B2 | 6/2008 | Yoon et al. | |
| 7,483,972 B2 | 1/2009 | Bhattacharya et al. | |
| 7,644,365 B2 | 1/2010 | Bhattacharya et al. | |
| 2002/0019945 A1 | 2/2002 | Houston et al. | |
| 2002/0069369 A1 | 6/2002 | Tremain | |
| 2002/0099958 A1 | 7/2002 | Hrabik et al. | |
| 2002/0104014 A1 | 8/2002 | Zobel et al. | |
| 2002/0147803 A1 | 10/2002 | Dodd et al. | |
| 2002/0178383 A1 * | 11/2002 | Hrabik et al. | 713/201 |
| 2002/0184532 A1 | 12/2002 | Hackenberger et al. | |
| 2003/0023876 A1 | 1/2003 | Bardsley et al. | |
| 2003/0084349 A1 | 5/2003 | Friedrichs et al. | |
| 2003/0093514 A1 | 5/2003 | Valdes et al. | |
| 2003/0093692 A1 | 5/2003 | Porras | |
| 2003/0101358 A1 | 5/2003 | Porras et al. | |
| 2003/0188189 A1 | 10/2003 | Desai et al. | |
| 2003/0196123 A1 | 10/2003 | Rowland et al. | |
| 2003/0221123 A1 | 11/2003 | Beavers | |
| 2004/0010601 A1 * | 1/2004 | Afergan et al. | 709/229 |
| 2004/0010718 A1 | 1/2004 | Porras et al. | |
| 2004/0015718 A1 | 1/2004 | DeClouet | |
| 2004/0024864 A1 | 2/2004 | Porras et al. | |
| 2004/0034795 A1 | 2/2004 | Anderson et al. | |
| 2004/0034800 A1 | 2/2004 | Singhal et al. | |
| 2004/0044912 A1 | 3/2004 | Connary et al. | |
| 2004/0073800 A1 | 4/2004 | Shah et al. | |
| 2004/0098623 A1 | 5/2004 | Scheidell | |
| 2004/0123141 A1 | 6/2004 | Yadav | |
| 2004/0221191 A1 | 11/2004 | Porras et al. | |
| 2005/0027845 A1 | 2/2005 | Secor et al. | |
| 2005/0060562 A1 | 3/2005 | Bhattacharya et al. | |
| 2005/0204404 A1 | 9/2005 | Hrabik et al. | |
| 2005/0235360 A1 | 10/2005 | Pearson | |
| 2005/0251860 A1 | 11/2005 | Saurabh et al. | |
| 2006/0069956 A1 | 3/2006 | Steinberg et al. | |
| 2006/0095587 A1 | 5/2006 | Bhattacharya et al. | |
| 2006/0212932 A1 | 9/2006 | Patrick et al. | |
| 2007/0118905 A1 | 5/2007 | Morin et al. | |
| 2007/0136437 A1 | 6/2007 | Shankar et al. | |
| 2007/0150579 A1 | 6/2007 | Morin et al. | |
| 2007/0162973 A1 | 7/2007 | Schneier et al. | |
| 2007/0169038 A1 | 7/2007 | Shankar et al. | |
| 2007/0234426 A1 | 10/2007 | Khanolkar et al. | |
| 2007/0260931 A1 | 11/2007 | Aguilar-Macias et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2008/0165000 A1 | 7/2008 | Morin et al. | |
| 2010/0058165 A1 | 3/2010 | Bhattacharya et al. | |

FOREIGN PATENT DOCUMENTS

| | | |
|---|---|---|
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

Bohge et al. "An authentication Framework for Hierarchical Ad Hoc Sensor Networks", ACM Press, Preceedings of 2003 ACM workshop on Wireless Security WISE 2003, Sep. 2003, pp. 79-87.*
Ning et al. "Abastraction-based intrusion detection is distributed environments", ACM Press, Nov. 2001, vol. 4, Issue 4, pp. 407-452.*
Wang et al. "Mobile Networks and Application", Kluwer Academic Publisher, Aug. 2003, vol. 8, Issue 4, pp. 413-423.*
U.S. Appl. No. 60/405,921, filed Aug. 26, 2002, Gisby et al.
ArcSight, "About ArcSight Team," date unknown, [online] [Retrieved on Oct. 25, 2002] Retrieved from the Internet <URL: http://www.arcsight.com/about_team.htm>.
ArcSight, "About Overview," Oct. 14, 2002, [online] [Retrieved on Apr. 21, 2006] Retrieved from the Internet <URL:http://web.archive.org/web/20021014041614/http://www.arcsight.com/about.htm>.
ArcSight, "Contact Info," date unknown, [online] [Retrieved on Oct. 25, 2002] Retrieved from the Internet <URL: http://www.arcsight.com/contact.htm>.
ArcSight, "Enterprise Coverage: Technology Architecture," date unknown, [online] Retrieved from the Internet <URL: http://www.snaiso.com/Documentation/Arcsight/arcsight_archdta.pdf>.
ArcSight, "Managed Process: ArcSight Reporting System," date unknown, [online] Retrieved from the Internet <URL: http://www.snaiso.com/Documentation/Arcsight/arcsight_reportsys.pdf>.
ArcSight, "Managed Process: Console-Based Management," date unknown, [online] Retrieved from the Internet <URL: http://www.snaiso.com/Documentation/Arcsight/arcsight_console.pdf >.
ArcSight, "Precision Intelligence: SmartRules™ and Cross-Correlation," date unknown, [online] Retrieved from the Internet <URL: http://www.snaiso.com/Documentation/Arcsight/arcsight_correlation.pdf>.
ArcSight, "Precision Intelligence: SmartAgent™," date unknown, [online] Retrieved from the Internet <URL: http://www.ossmanagement.com/SmartAgent.pdf>.
ArcSight, "Product Info: Product Overview and Architecture," date unknown, [online] [Retrieved on Oct. 25, 2002] Retrieved from the Internet <URL: http://www.arcsight.com/product.htm>.
ArcSight, "Product Info: 360° Intelligence Yields Precision Risk Management," date unknown, [online] [Retrieved on Oct. 25, 2002] Retrieved from the Internet <URL: http://www.arcsight.com/product_info01.htm>.
ArcSight, "Product Info: ArcSight SmartAgents." Oct. 10, 2002, [online] [Retrieved on Apr. 21, 2006] Retrieved from the Internet <URL:http://web.archive.org/web/20021010135236/http://www.arcsight.com/product_info02.htm>.
ArcSight, "Product Info: ArcSight Cross-Device Correlation," date unknown, [online] [Retrieved on Oct. 25, 2005] Retrieved from the Internet <URL:http://www.arcsight.com/product_info03.htm>.

(56) References Cited

OTHER PUBLICATIONS

ArcSight, "Product Info: ArcSight Manager," date unknown, [online] [Retrieved on Oct. 25, 2002] Retrieved from the Internet <URL: http://www.arcsight.com/product_info04.htm>.
ArcSight, "Product Info: ArcSight Console," date unknown, [online] [Retrieved on Nov. 15, 2002] Retrieved from the Internet <URL: http:www.arcsight.com/product_info05.htm>.
ArcSight, "Product Info: ArcSight Reporting System," date unknown, [online] [Retrieved on Oct. 25, 2002] Retrieved from the Internet <URL: http:www.arcsight.com/product_info06.htm>.
ArcSight, "Product Info: Enterprise Scaling," date unknown, [online] [Retrieved on Oct. 25, 2002] Retrieved from the Internet <URL: http://www.arcsight.com/product_info07.htm>.
ArcSight, "Security Management for the Enterprise," 2002, [online] [Retrieved on Oct. 25, 2002] Retrieved from the Internet <URL: http:www.arcsight.com/>.
ArcSight, "Technical Brief: How Correlation Eliminates False Positives," date unknown, source unknown.
Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.
Derodeff, C. "Got Correlation? Not Without Normalization," 2002, [online] Retrieved from the Internet <URL: http://www.svic.com/papers/pdf/Got-Correlation_malization.pdf>.
Cheung, S. et al., "Emerald Intrusion Incident Report: 601 Message Specification," Aug. 10, 2000, System Design Laboratory, SRI International.
National Institute of Standards and Technology (NIST), "Federal Information Processing Standards Publication (FIPS Pub) 199: Standards for Security Categorization of Federal Information and Information Systems", Feb. 2004.
Haley Enterprise, "Production Systems," 2002, [online] [Retrieved on Oct. 29, 2002] Retrieved from the Internet <URL: http://www.haley.com/0072567836705810/ProductionSystems.html>.
Haley Enterprise, "The Rete Algorithm," 2002, [online] [Retrieved on Oct. 29, 2002] Retrieved from the Internet <URL: http://www.haley.com/0072567836705810/ReteAlgorithm.html>.
Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.
Halme, L.R. et al., "Aint Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.
Lindqvist, U. et al., "Detecting Computer and Network Misuse Through the Production-Based Expert System Toolset (P-Best)," Proceedings of the IEEE Symposium on Security and Privacy, Oakland, California, May 9-12, 1999.
CERT Coordination Center, "Overview of Attack Trends," 2002, [online] Retrieved from the Internet <URL: http://www.cert.org/archive/pdf/attack_trends.pdf>.
Porras, P.A. et al., "Emerald: Event Monitoring Enabling Responses to Anomalous Live Disturbances," Oct. 1997, Proceedings of the 20th NIST-NCSC National information Systems Security (NISS) Conference.
Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.
Ingargiola, G., "The Rete Algorithm," date unknown, [online] [Retrieved on Oct. 29, 2002] Retrieved from the Internet <URL:http://yoda.cis.temple.edu:8080/UGAIWWW/lectures/rete.html>.
Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.
National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.
Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.
Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.
Javitz, H. S., et al., "The NIDES Statistical Component Description and Justification," SRI Project 3131, Contract N00039-92-C-0015, Annual Report, A010, Mar. 7, 1994.
Jou, Y. F., et al., "Architecture Design of a Scalable Intrusion Detection System for the Emerging Network Infrastructure," MCNC, Technical Report CDRL A005, Apr. 1997.
Porras, P. A., et al., "Live Traffic Analysis of TCP/IP Gateways," Symposium on Networks and Distributed Systems Security, Internet Society, Mar. 1998.
Robinson, S. L., *"Memorandum Opinion" in SRI International, Inc. v. Internet Security Systems, Inc.* and Symantec Corporation (D. Del., Civ. No. 04-1199-SLR), Oct. 17, 2006.
Valdes, A., et al., "Statistical Methods for Computer Usage Anomaly Detection Using NIDES (Next-Generation Intrusion Detection Expert System)," Proceedings of the Third International Workship on Rough Sets and Soft Computing (RSSC 94), Jan. 27, 1995, San Jose, CA, pp. 306-311.
U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.
Office Action for U.S. Appl. No. 10/683,221, Jan. 24, 2007, 10 Pages.
Office Action for U.S. Appl. No. 10/683,221, Aug. 6, 2007, 10 Pages.
Office Action for U.S. Appl. No. 10/683,221, Feb. 6, 2008, 14 Pages.
Office Action for U.S. Appl. No. 10/683,221, Oct. 1, 2008, 14 Pages.
Office Action for U.S. Appl. No. 10/683,221, Jun. 1, 2009, 18 Pages.
Office Action for U.S. Appl. No. 10/683,221, Dec. 8, 2009, 8 Pages.
Office Action for U.S. Appl. No. 10/683,221, Jun. 9, 2010, 5 pages.

\* cited by examiner

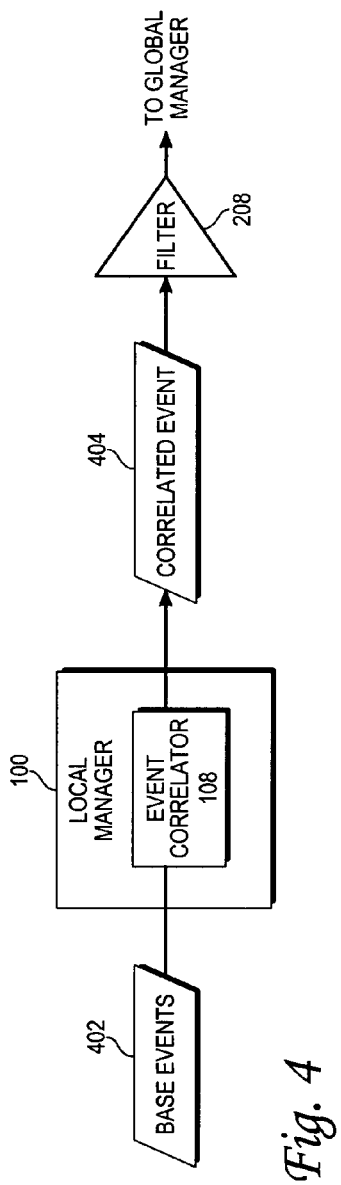
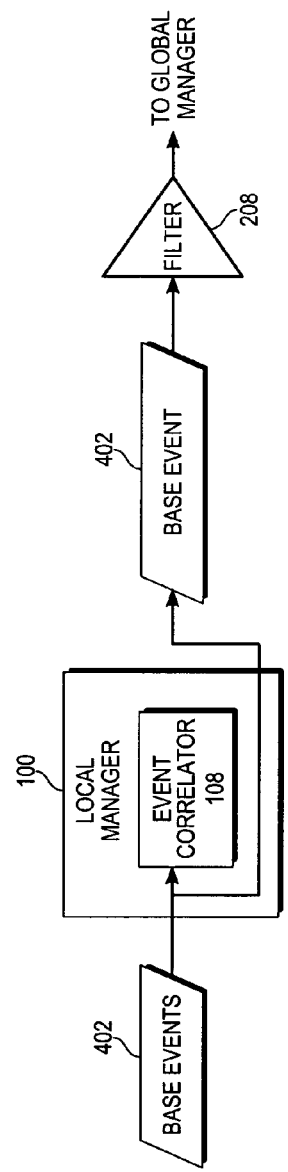

HIERARCHICAL ARCHITECTURE IN A NETWORK SECURITY SYSTEM

FIELD OF THE INVENTION

The present invention relates to a network security system, and, in particular, to a network security system having a hierarchical architecture.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, various network security monitor devices have been developed to help uncover attempts by unauthorized persons and/or devices to gain access to computer networks and the information stored therein.

Network security products largely include Intrusion Detection Systems (IDS's), which can be Network or Host based (NIDS and HIDS respectively). Other network security products include firewalls, router logs, and various other event reporting devices. Due to the size of their networks, many enterprises deploy hundreds, or thousands of these products thoughts their networks. Thus, network security personnel are bombarded alarms representing possible security threats. Most enterprises do not have the resources or the qualified personnel to individually attend to all of the received alarms.

Furthermore, many large organizations deploy these devices locally at each of their sites to distribute computational resources and to limit bandwidth use. Since security events generally concern local attacks, such division is generally helpful. However, localizing network security can have disadvantages, since not all available and relevant information is used during the threat analysis and decision making.

SUMMARY OF THE INVENTION

A network security system having a hierarchical configuration is provided. In one embodiment the present invention includes a plurality of subsystem's, where each subsystem includes a plurality of distributed software agents configured to collect base security events from monitor devices, and a local manager module coupled to the plurality of distributed software agents to generate correlated events by correlating the base security events. Each subsystem can also include a filter coupled to the manager module to select which base security events are to be processed further. The selected base security events are passed to a global manager module coupled to the plurality of subsystems that generates global correlated events by correlating the base security events selected for further processing by each filter of each subsystem.

BRIEF DESCRIPTION OF THE DRAWINGS

The present invention is illustrated by way of example, and not by way of limitation, in the figures of the accompanying drawings in which like reference numerals refer to similar elements and in which:

FIG. 4 is a block diagram illustrating additional detail of one embodiment of a subsystem according to the present invention;

FIG. 5 is a block diagram illustrating additional detail of another embodiment of a subsystem according to the present invention.

DETAILED DESCRIPTION

Figure 1:
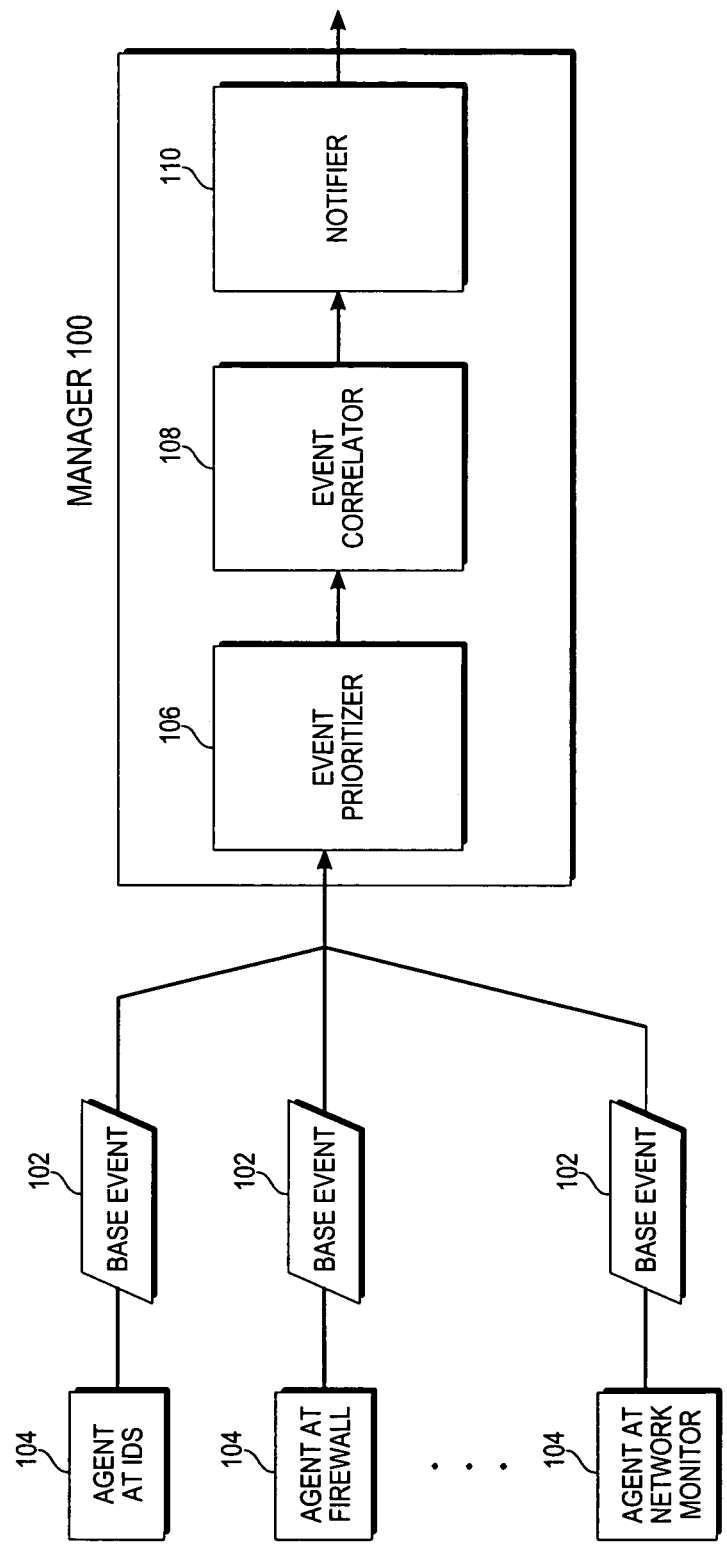
FIG. 1 is a block diagram illustrating a standard configuration for implementing a network security system.

Described herein is a network security system having a hierarchical configuration.

Although the present system will be discussed with reference to various illustrated examples, these examples should not be read to limit the broader spirit and scope of the present invention. For example, the examples presented herein describe distributed agents, managers and various network devices, which are but one embodiment of the present invention. The general concepts and reach of the present invention are much broader and may extend to any computer-based or network-based security system.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a manager module 100 of a network security system that is not hierarchically configured is illustrated. The manager 100 receives base events 102 (also referred to as "security events" or "events") from various sources. For example, the manager 100 can receive a base event 102 from a distributed software agent 104 associated with an IDS, or from the agent 104 associated with a firewall. In one embodiment, the IDS's alarms are normalized by the software agent 104 before being reported as an event 102 to the manager 100.

In formal security terminology, an "event" is an actual physical occurrence—such as a packet traversing the network, or a file being deleted—and an "alarm" is a representation of the "event." As used in this application, however, a security event 102 (or just "event") refers to a representation of a physical phenomenon, thus being an "alarm" according to strict formal terminology. In this application, alarms are produced by a network security device associated with an agent 104—such as an HIDS, a NIDS, or a firewall—and a base event 102 refers to the output of the agent 104 after the agent 104 processed, e.g. aggregated, batched, or normalized, the alarms. Furthermore, an unprocessed alarm directly from a sensor device is also considered to be a "base event" for the purposes of this application.

A base event 102 can have various fields that contain information about the event 102. Several example events are described, for example, in the co-pending application entitled "Real Time Monitoring and Analysis of Events from Multiple Network Security Devices", filed on Dec. 2, 2002, application Ser. No. 10/308,415 for inventors Hugh S. Njemanze and Pravin S. Kothari, and in the co-pending application entitled "Threat Dection in a Network Security System", filed on Sep. 3, 2003, application Ser. No. 10/655,062, for inventors Kenny Tidwell, Kumar Saurabh, Depurate Dash, Hugh S. Njemanze and Pravin S. Kothari, both applications incorporated herein fully by reference. The base events are then processed by the manager module 100. Such processing can include prioritisation performed by an event prioritizer module 106. Event prioritisation is described in more detail in the co-pending application entitled "Thread Detection in a Network Secutiry system, "incorporated by reference above.

Furthermore, event processing can include event correlation performed by an event correlator module 108 using various rules. Event correlation is described in detail in application Ser. No. 10/308,415. The output of the event correlator 108 is correlated events. A correlated event is a conclusion drawn from several base events based on the rules. For example, twenty failed logins followed by a successful login and twenty-one base events that can translate to one correlated event, namely "successful brute-force dictionary attack." The manager module 100 can also include a notifier module 110 to send alert information to the system administrators. The notifier is also described in application Ser. No. 10/308,415.

The correlation rules that operate on the events evaluate threats and attacks according to selected criteria (e.g., degree of threat, level of success, vulnerability of target and value of target) and generate alerts according to a security intelligence taxonomy that focuses attention on the most dangerous and potentially most damaging attacks. For example, threats to network assets that are deemed not to have succeeded or that are not likely to succeed may be coded green, while those that have succeeded or have a high probability of success might be coded red. The value of the security information taxonomy lies in its ability to eliminate false positives while clearly identifying real threats to vulnerable and valuable assets.

In general, the rules may be designed to capture threats and attacks that are typical in large, diverse networks and may be organized to provide multiple lines of defense by detecting specific activities and grouping them according to level of threat such as:

Reconnaissance zone transfer, port scan, protocol, scanning, etc.

Suspicious illegal outgoing traffic, unusual levels of alerts from the same host, etc.

Attack overflow, IDS evasion, virus, denial of service, etc.

Successful compromise of a backdoor, root compromise, covert channel exploit, etc.

Similar events and signatures may be grouped into rule categories that can be utilized by the rules to insulate the rule from changes in vendor-specific event details. For example, event names may change between product releases or new devices may be added to the network infrastructure with a new set of nomenclature. Since the rule categories map similar signatures into a single name that is used by the rules engine, if an individual network device changes taxonomy, only the mapping is changed, not the rule definition. Therefore, despite changes in individual devices, the investment in custom defined rules is preserved.

Figure 2:
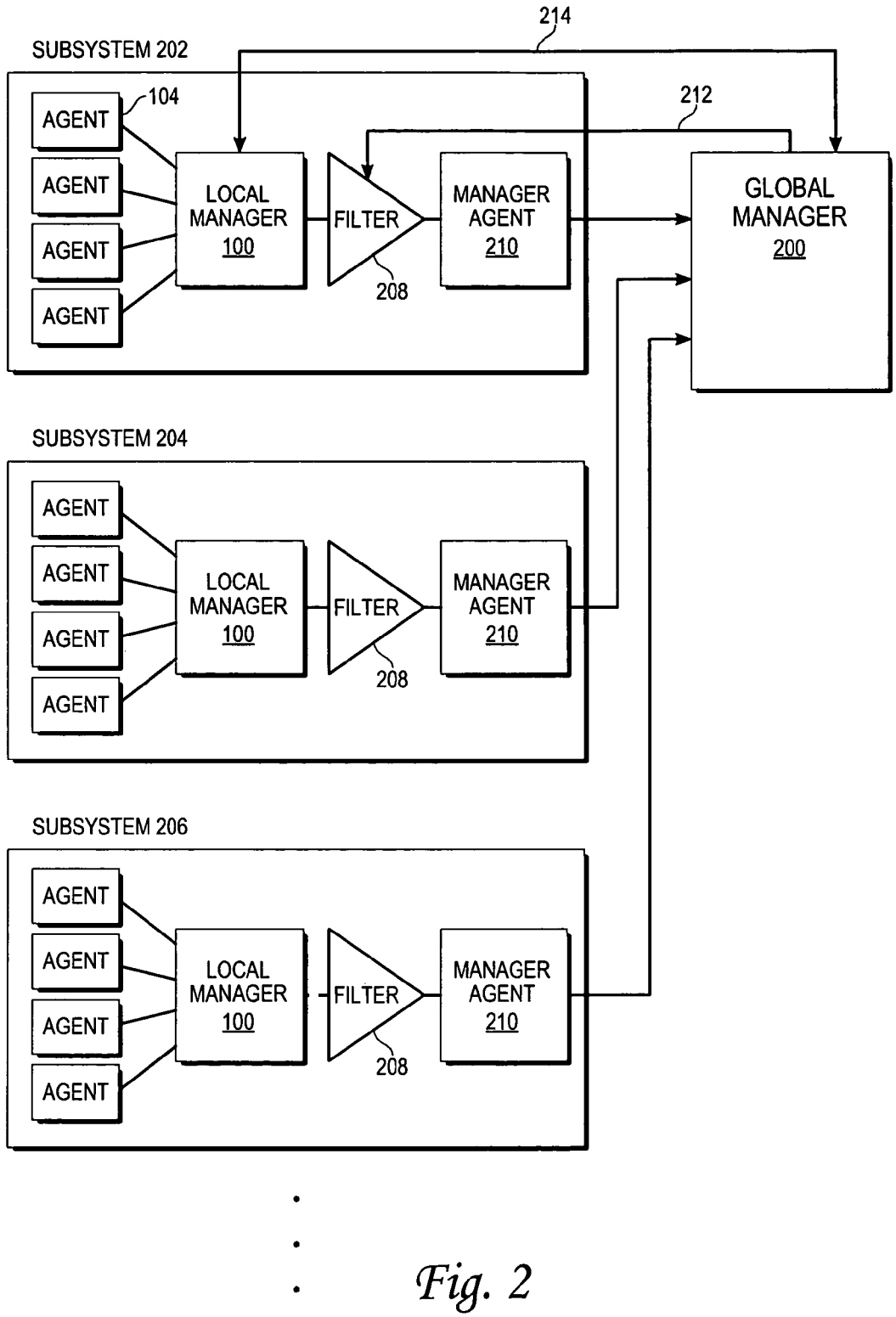
FIG. 2 is a block diagram illustrating a hierarchical configuration for implementing a network security system according to one embodiment of the present invention.

Referring now to FIG. 2, an example of a hierarchically configured network security system according to one embodiment of the present invention is illustrated. The manager module 100 of FIG. 1 is renamed local manager 100 for FIG. 2 to indicate that other managers exist in the system.

Thus, agents 104 and local manager 100 are identical to their counterparts described with reference to FIG. 1 above. However, in FIG. 2, the agents 104 collect events only from a subsystem 202 of the network security system, and the local manager 100 processes only these base events. For example, subsystem 202 can be the local security system at a company site or location.

As described above, one output of the local manager is correlated events. In one embodiment described with reference to FIG. 2, these correlated events are not only used locally, but are provided to a global manager module 200 that receives similar inputs from other sites, such as subsystem 204 and subsystem 206. In one embodiment, the correlated events are first passed through a filter 208 to a manager agent 210.

The manager agent 210 can be implemented similarly or identically to agents 104. The tasks performed by the manager agent can also be similar or identical to agents 104, such as normalization, aggregation, batching, and other tasks described above and in the incorporated applications.

The filter 208 can be implemented using Boolean expressions. Its purpose is to select the correlated events to be delivered to the global manager module 200. For example, the filter 208 can be set to block out correlated events deemed only to have local significance. In other embodiments, bandwidth constraints between the global manager 200 and subsystem 202 may allow for only a relatively few correlated events to be sent, hence allowing only specifically requested types of correlated event through the filter.

For example, the global manager 200, through back-link 212, can program the filter 208 to provide all correlated events relating to some IP address of interest. In similar fashion, the global manager 200 can configure what it receives from each subsystem to anything the filters 208 can be programmed to, using back-links 212 to each subsystem. In other embodiments, the filter 208 can be programmed and configured locally at subsystem 202. In other embodiments in which all correlated events are provided to the global manager 200, the filter 208 can be omitted.

In one embodiment, the global manager 200, through back-channel 214, can request information from the local manager 100. For example, the global manager 200 may send a request to the local manager 100 for all base events that were correlated to produce a particular correlated event previously sent to the global manager 200.

Subsystem 204 and subsystem 206 can be similar or identical to subsystem 202 described above. Any number of subsystems can be similarly configured to feed correlated events to the global manager 200. In one embodiment, these base events are retrieved from local storage by the local manager 100, and are sent to the global manager 200 through back-channel 214 to avoid re-correlation of these base events.

The global manager module 200 receives the correlated events from the various subsystems. These correlated events can be referred to as local correlated events, since they are local to a specific subsystem. In one embodiment, the global manager 200 functions in a manner similar to the local managers 100, treating the local correlated events as base events. Thus, the global manager 200 can perform a correlation of the local correlated events to generate global correlated events.

Figure 3:
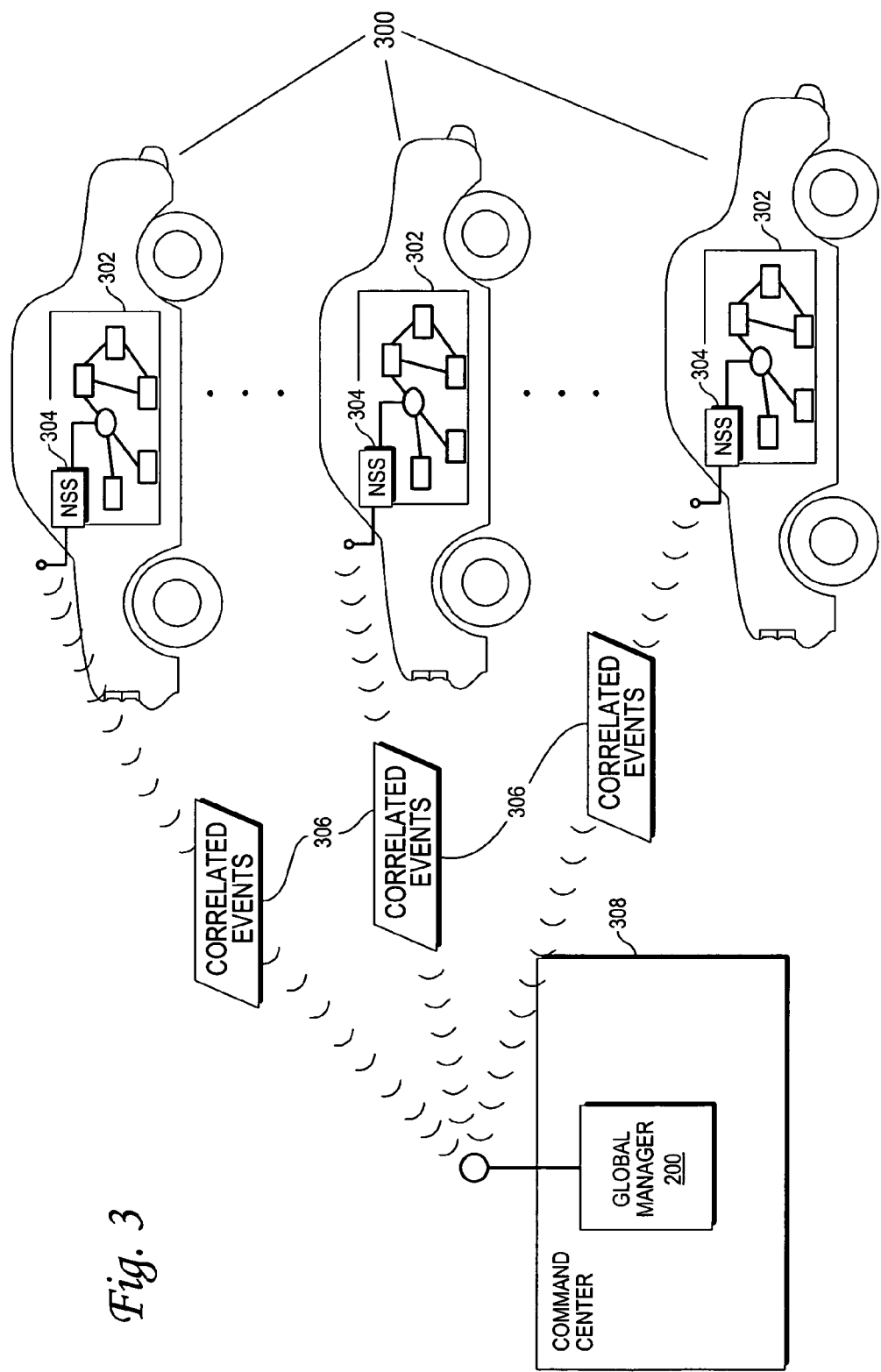
FIG. 3 is a block diagram illustrating an example environment in which one embodiment of the present invention may be implemented.

An example is given with reference to FIG. 3. FIG. 3 shows a number of military vehicles 300. Each vehicle 300 has an on-board network 302 consisting of various meters, radars, communication equipment, global positioning equipment, processors, data storage, and other network components. Each network 302 is monitored by a local network security system 304. The local network security system can be similar to subsystem 202 in FIG. 2.

In this example, each local security network picked up an attempted unauthorized network access. This conclusion is a local correlated event 306 that may be based on various base events. When these local correlated events 306 are reported wirelessly to a command centre 308 housing the global manager module 200, the global manager 200 can correlate these local correlated events to determine the location of a hacker. This would be a global correlated event, since it uses correlated events from various local security networks.

In this example, finding the hacker would be difficult for a single vehicle with a local network security system, since each vehicle experiences many attacks. However, if all vehicles experience an attack on the same street corner, broader conclusions about the location of a specific attacker can be drawn.

Referring now to FIG. 4, data flow according to one embodiment of the present invention is reiterated. FIG. 4 shows a closer look at subsystem 202 of FIG. 2. As explained above, base events 402 collected by the distributed software agents are correlated by the local manager module 100 to generate local correlated events 404. The correlated events are provided to the filter 208 on their way to the global manager module 200.

Another embodiment of the present invention is now described with reference to FIG. 5. FIG. 5 shows another close-up of subsystem 202. In this embodiment, however, the local correlated events 404 generated from the base events 402 are used locally. Furthermore, the base events 402 are provided to the filter 208. Those base events 404 that are selected for pass-through by the filter 208 are then provided to the global manager 200, according to the description referencing FIG. 2.

Figure 6:
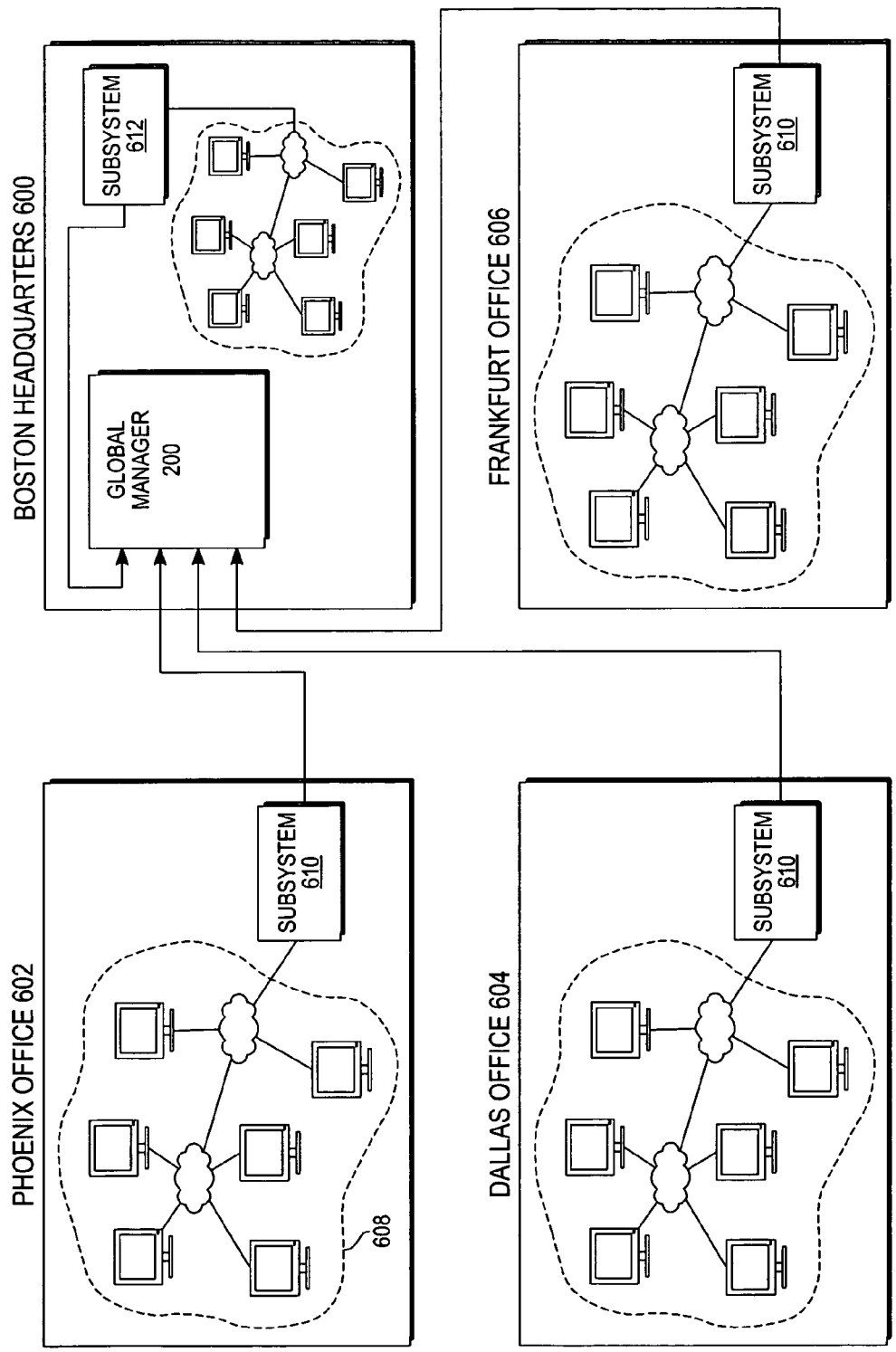
FIG. 6 is a block diagram illustrating another example environment in which one embodiment of the present invention may be implemented.

An example is given with reference to FIG. 6. FIG. 6 shows three satellite offices—a Phoenix 602, a Dallas 604, and a Frankfurt office 606—and the Boston headquarters 600 of an enterprise. Each satellite office has a computer network, such as network 608 of the Phoenix office 602. Each network is monitored by a network security subsystem, such as subsystem 610. These subsystems can be implemented as described with reference to FIG. 2 and FIG. 5.

As described with reference to FIG. 5, each local manager of the network security subsystems is configured to pass base events through. In this example, the filter 208 is programmed by the global manager 200 to only select high-priority base events to be provided to the global manager 200. The global manager module 200 thus receives high-priority base events from all connected satellite offices, and from the local Boston subsystem 612.

The global manager 200 can thus correlate all high-priority base events, not just the local ones. In this manner, the global correlation performed by the global manager 200 results in global correlated events that can concern a global attack. For example, an attacker trying to bring down the Phoenix network 608 may not be catastrophic, the same attacker trying to bring down multiple networks may be.

In another example, an attacker may have been detected by subsystem 610 to have performed reconnaissance—such as scanning for populated addresses and open ports—on the Phoenix network 608. If this attacker now attacks the Dallas network, the Dallas subsystem 610 is unaware of the heightened security risk. However, the global manager 200 will be able to inform the Dallas office 604 that an attack they thought to be low priority is being perpetrated by an attacker using information from a previous reconnaissance.

In other embodiments, each subsystem can be configured as a combination of FIGS. 4 and 5, with both base events 402 and local correlated events 404 being provided to the filter 208, which can select among them according to its configuration. The filter 208 can be user programmed at each site, or automatically and remotely programmed by the global manager 200 according its perceived needs. For example, if the global manager 200 thinks that an attacker with a certain IP address is trying to perform a global attack, it may set the filters 208 of all subsystems to let base and correlated events relating to that IP address through.

Thus, a hierarchically configured network security system, and event processing in such a system has been described. In the foregoing description, various specific intermediary values were given names, such as "local correlated events," and various specific modules, such as the "manager agent," have been described. However, these names are merely to describe and illustrate various aspects of the present invention, and in no way limit the scope of the present invention. Furthermore, various modules, such as the local manager module 100 and the global manager module 200 in FIG. 2, can be implemented as software or hardware modules, or without dividing their functionalities into modules at all. The present invention is not limited to any modular architecture, whether described above or not.

In the foregoing description, the various examples and embodiments were meant to be illustrative of the present invention and not restrictive in terms of their scope. Accordingly, the invention should be measured only in terms of the claims, which follow.

The invention claimed is:

1. A network security system comprising:
a plurality of subsystems, each subsystem comprising:
  a plurality of distributed software agents, each agent configured:
   to collect a base security event from a monitor device; and
   to transmit the base security event;
  a local manager module coupled to the plurality of distributed software agents, configured:
   to receive, from each agent, the base security event;
   to generate one or more local correlated events by correlating the received base security events, wherein a local correlated event comprises a conclusion drawn from the received base security events according to a rule based on at least a vulnerability of a target network node, the rule grouping security incidents associated with the base security events into a plurality of threat levels, and wherein the conclusion indicates that a plurality of the received base security events is associated with a same security incident; and
   to transmit the one or more local correlated events; and
  a filter coupled to the local manager module, configured:
   to receive the one or more local correlated events;
   to select local correlated events; and
   to transmit the selected local correlated events; and
a global manager module coupled to the plurality of subsystems, comprising a processor configured:
  to receive, from each subsystem, the selected local correlated events; and
  to generate one or more global correlated events by correlating the received selected local correlated events, wherein a global correlated event comprises a second conclusion drawn from the received selected local correlated events according to a second rule, and wherein the second conclusion indicates that a plurality of the received selected local correlated events is associated with a second same security incident.

2. The network security system of claim 1, wherein the filter can be automatically programmed by the global manager module.

3. The network security system of claim 1, wherein each subsystem further comprises a local manager agent coupled to the filter to collect the selected local correlated events.

4. The network security system of claim 1, wherein each subsystem comprises a local network security system.

5. The network security system of claim 4, wherein each local network security system monitors a network associated with a site.

6. The network security system of claim 1, wherein the plurality of threat levels comprises more than two threat levels.

7. The network security system of claim 1, wherein the plurality of threat levels comprises:
 a first threat level comprising one or more of reconnaissance zone transfer, port scan, protocol and scanning;
 a second threat level comprising suspicious illegal outgoing traffic and unusual levels of alerts from the same host;
 a third threat level comprising attack overflow, IDS evasion, virus, and denial of service; and
 a fourth threat level comprising successful compromise of a backdoor, root compromise and covert channel exploit.

8. A method comprising:
collecting base security events at a plurality of sites;
generating local correlated events at each site by correlating the base security events collected at each site, wherein a local correlated event comprises a conclusion drawn from the collected base security events according to a rule based on at least a vulnerability of a target network node, the rule grouping security incidents associated with the base security events into a plurality of threat levels, and wherein the conclusion indicates that a plurality of the received base security events is associated with a same security incident;
selecting local correlated events from each site; and
a processor generating global correlated events by correlating the selected local correlated events, wherein a global correlated event comprises a second conclusion drawn from the selected local correlated events according to a second rule, and wherein the second conclusion indicates that a plurality of the selected local correlated events is associated with a second same security incident.

9. The method of claim 8, further comprising filtering the local correlated events at each site to determine which local correlated events to collect.

10. The method of claim 8, wherein the collecting the base security events at each site is performed by a plurality of distributed software agents at each site.

11. The method of claim 8, wherein the local correlated events are generated by a local network security system monitoring each site.

12. The method of claim 11, wherein the collecting of base security events from each site is performed by a distributed software agent associated with each site.

13. The method of claim 8, wherein the global correlated events are generated by a global manager module.

14. A non-transitory machine-readable medium having stored thereon data representing instructions that, when executed by a processor, causes the processor to perform operations comprising:
collecting base security events at a plurality of sites;
generating local correlated events at each site by correlating the base security events collected at each site, wherein a local correlated event comprises a conclusion drawn from the collected base security events according to a rule based on at least a vulnerability of a target network node, the rule grouping security incidents associated with the base security events into a plurality of threat levels, and wherein the conclusion indicates that a plurality of the received base security events is associated with a same security incident;
selecting local correlated events from each site; and
generating global correlated events by correlating the selected local correlated events, wherein a global correlated event comprises a second conclusion drawn from the selected local correlated events according to a second rule, and wherein the second conclusion indicates that a plurality of the selected local correlated events is associated with a second same security incident.

15. The non-transitory machine-readable medium of claim 14, wherein the instructions further cause the processor to perform operations comprising filtering the local correlated events at each site to determine which local correlated events to collect.

16. The non-transitory machine-readable medium of claim 14, wherein the collecting the base security events at each site is performed by a plurality of distributed software agents at each site.

17. The non-transitory machine-readable medium of claim 14, wherein the local correlated events are generated by a local network security system monitoring each site.

18. The non-transitory machine-readable medium of claim 17, wherein the collecting of base security events from each site is performed by a distributed software agent associated with each site.

19. The non-transitory machine-readable medium of claim 14, wherein the global correlated events are generated by a global manager module.

20. A network security system comprising:
a plurality of subsystems, each subsystem comprising:
  a plurality of distributed software agents, each agent configured:
    to collect a base security event from a monitor device; and
    to transmit the base security event;
  a local manager module coupled to the plurality of distributed software agents, configured:
    to receive, from each agent, the base security event;
    to transmit the base security events;
    to generate one or more local correlated events by correlating the received base security events, wherein a local correlated event comprises a conclusion drawn from the received base security events according to a rule based on at least a vulnerability of a target network node, the rule grouping security incidents associated with the base security events into a plurality of threat levels, and wherein the conclusion indicates that a plurality of the received base security events is associated with a same security incident; and
    to transmit the one or more local correlated events; and
  a filter coupled to the local manager module, configured:
    to receive the base security events;
    to select base security events; and
    to transmit the selected base security events; and
a global manager module coupled to the plurality of subsystems, comprising a processor configured:
  to receive, from each subsystem, the one or more local correlated events;
  to receive, from each subsystem, the selected base security events; and
  to generate one or more global correlated events by correlating the one or more local correlated events and the received selected base security events.

* * * * *